(12) United States Patent
Gersten

(10) Patent No.: US 9,806,888 B1
(45) Date of Patent: Oct. 31, 2017

(54) SYSTEM AND METHOD FOR DATA PROTECTION USING DYNAMIC TOKENS

(71) Applicant: Shimon Gersten, San Diego, CA (US)

(72) Inventor: Shimon Gersten, San Diego, CA (US)

( * ) Notice: Subject to any disclaimer, the term of this patent is extended or adjusted under 35 U.S.C. 154(b) by 0 days.

(21) Appl. No.: 15/291,004

(22) Filed: Oct. 11, 2016

Related U.S. Application Data

(60) Provisional application No. 62/358,726, filed on Jul. 6, 2016.

(51) Int. Cl.
*H04L 9/32* (2006.01)
*H04L 9/16* (2006.01)

(52) U.S. Cl.
CPC .............. *H04L 9/3213* (2013.01); *H04L 9/16* (2013.01)

(58) Field of Classification Search
CPC ................................. H04L 9/3213; H04L 9/16
See application file for complete search history.

(56) References Cited

U.S. PATENT DOCUMENTS

| | | | |
|---|---|---|---|
| 2003/0081774 A1* | 5/2003 | Lin | H04L 9/0838 380/44 |
| 2004/0190714 A1* | 9/2004 | Masui | G06F 21/6209 380/43 |
| 2009/0049307 A1* | 2/2009 | Lin | G06F 21/72 713/185 |
| 2010/0122091 A1* | 5/2010 | Huang | H04L 63/067 713/171 |
| 2010/0131764 A1* | 5/2010 | Goh | H04L 63/0464 713/171 |
| 2011/0099384 A1* | 4/2011 | Grange | H04L 9/0897 713/184 |
| 2013/0208893 A1* | 8/2013 | Shablygin | H04L 9/0822 380/277 |
| 2014/0129838 A1* | 5/2014 | Kim | H04L 9/3213 713/171 |
| 2014/0301550 A1* | 10/2014 | Lewis | H04L 9/0825 380/259 |
| 2016/0150411 A1* | 5/2016 | Liu | G06F 21/31 726/4 |
| 2016/0277933 A1* | 9/2016 | Moon | H04W 12/04 |
| 2016/0337354 A1* | 11/2016 | Smadja | H04L 63/062 |
| 2016/0337786 A1* | 11/2016 | Kafle | H04W 4/001 |
| 2017/0169640 A1* | 6/2017 | Britt | G07C 9/00309 |
| 2017/0171607 A1* | 6/2017 | Britt | H04N 21/43615 |

OTHER PUBLICATIONS

Wu et al., "Dynamic Keys Based Sensitive Information System", 2008, IEEE, 1895-1901.*

* cited by examiner

*Primary Examiner* — Matthew Smithers
(74) *Attorney, Agent, or Firm* — Cooley LLP

(57) ABSTRACT

A Data Protection Server (DPS) configured to authenticate, encrypt and decrypt blocks of data by using dynamic tokens. Instances of a DPS may be deployed in association with a host server and with multiple client devices to protect data exchanged between them. Since each DPS instance typically requires minimal device storage and computational resources, use of a DPS may be particularly advantageous in connection with the protection of data generated by limited resources devices.

9 Claims, 12 Drawing Sheets

SYSTEM AND METHOD FOR DATA PROTECTION USING DYNAMIC TOKENS

CROSS-REFERENCE TO RELATED APPLICATIONS

The present application claims the benefit of priority under 35 U.S.C. §119(e) of U.S. Provisional Application Ser. No. 62/358,726, entitled "DATA PROTECTION SERVER WITH DYNAMIC TOKEN ACCESS", filed Jul. 6, 2016, the content of which is hereby incorporated by reference in its entirety for all purposes.

FIELD

The present disclosure pertains generally to data authentication, encryption and decryption methods for enhancing the security of computer systems and communications and, in particular, to data protection techniques useful in devices with limited computing and other resources.

BACKGROUND

Maintaining the security of data communicated over, for example, wide or local area networks is typically of great importance to the operators or users of such networks. Data security may be enhanced within such networks and related computing systems through the use of authentication, encryption and decryption techniques.

However, conventional approaches to data encryption and decryption yielding a high level of data security may consume large amounts of one or both of computing and memory resources. As a consequence, such approaches may be infeasible in data security applications involving devices having only limited computational or data storage capabilities. For example, many proposed Internet of Things ("IoT") devices have very limited storage, computing resources and available power. Moreover, it will be important to be able to produce various IoT devices inexpensively so as not to unduly limit the growth of new markets relying upon such devices. Accordingly, any security enhancements to such devices should be capable of being implemented with minimal effort and at low cost.

Finally, many existing methods of data encryption rely upon the same "key" to encrypt data and to later decrypt the encrypted data. If the same key is repeatedly used for encryption and decryption, an observer may be able to determine the key and decrypt the observed data. Thus, in many applications it would be advantageous to avoid repetitive use of the same encryption key.

SUMMARY

In one aspect the disclosure pertains to a Data Protection Server (DPS) configured to authenticate, encrypt and decrypt blocks of data by using dynamic tokens. Instances of a DPS may be deployed in association with a host server and with multiple client devices to protect data exchanged between them. Embodiments of the DPS are particularly useful for limited resource devices such as wireless sensors. This is because each DPS instance typically requires minimal device storage and computational resources, and utilizes a simple service access protocol.

A client device may be a wireless sensor with access to a local or remote DPS instance. Once a client device is deployed and used it can access a DPS to exchange protected data with the host server.

An instance of a DPS is configured to provide encryption and decryption services for data sent by a particular client device by synthesizing and using Dynamic Key Instances (DKIs). In general, a unique Dynamic Key Instance (DKI) will be created by the DPS instance for each data packet communicated by the client device. A given DKI may be generated using a Dynamic Data Token (DDT) provided by the client device and Key Creation Material (KCM) associated with the client device. The KCM associated with a particular client device is generally saved in a Device Data Base (DDB) in association with a Device Serial Number (DSN) or other identifying information associated with the client device. By accessing the DDB, the host server is able to obtain the KCM necessary to decrypt data packets received from a given device associated with a particular DSN.

In one aspect the disclosure relates to a computer-implemented method for data protection. The method includes determining that a dynamic data token (DDT) has been received, the DDT including a plurality of DDT elements. The method includes generating a dynamic key instance (DKI) using the DDT and key creation material (KCM) including a plurality of KCM elements. The DKI includes an ordered combination of integer values corresponding to KCM elements included within the plurality of KCM elements. Data is then encrypted using the DKI so as to create encrypted data. A data packet including the encrypted data is then sent.

The DKI may be generated by selecting, for each of the plurality of DDT elements, at least one of the plurality of KCM elements addressed by a value of the one of the plurality of DDT elements. The KCM may be associated with a device serial number (DSN) of a device, and the method may include storing the KCM within a non-volatile memory of the device.

In another aspect the disclosure relates to an electronic device arrangement including a processor, a wireless transceiver, an electronic device configured to produce data and a memory including program code for a data protection server. When executed, the code for the data causes the processor to determine that a dynamic data token (DDT) has been received by the wireless device, the DDT including a plurality of DDT elements. The code further causes the processor to generate a dynamic key instance (DKI) using the DDT and key creation material (KCM) including a plurality of KCM elements. The DKI includes an ordered combination of integer values corresponding to KCM elements included within the plurality of KCM elements. Execution of the code further causes the processor to receive the data from the electronic device and to encrypt, using the DKI, the data so as to create encrypted data. The processor is further configured by the program code to instruct the wireless transceiver to send a data packet containing the encrypted data.

The disclosed system and method for data protection includes a number of advantageous features. For example, the disclosed approach results in an orders of magnitude reduction in the amount of storage required to support multiple keys, with only lightweight logic needed to provide such keys. The disclosed data protection schemes can be additive to existing security methods and are capable of being used whenever encryption keys are used. Moreover, the low overhead of the disclosed data protection approaches should assure compatibility with existing and future data communication protocols.

In terms of applicability to existing technologies, the disclosed data protection approaches are immediately useful for low power wireless protocols such as WiFi, Bluetooth, Thread, and the like. In addition, the disclosed data protection scheme may be useful for periodic authentication. Finally, the disclosed DPS encryption methodology may obviate the need to exchange keys, such as is required by various conventional encryption approaches (e.g., Diffie Hellman encryption).

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. Also, common but well-understood elements that are useful or necessary in a commercially feasible embodiment are often not depicted in order to facilitate a less obstructed view of these various embodiments of the present invention. In the drawings, like reference characters generally refer to like features (e.g., functionally similar and/or structurally similar elements).

DETAILED DESCRIPTION

Figure 1:
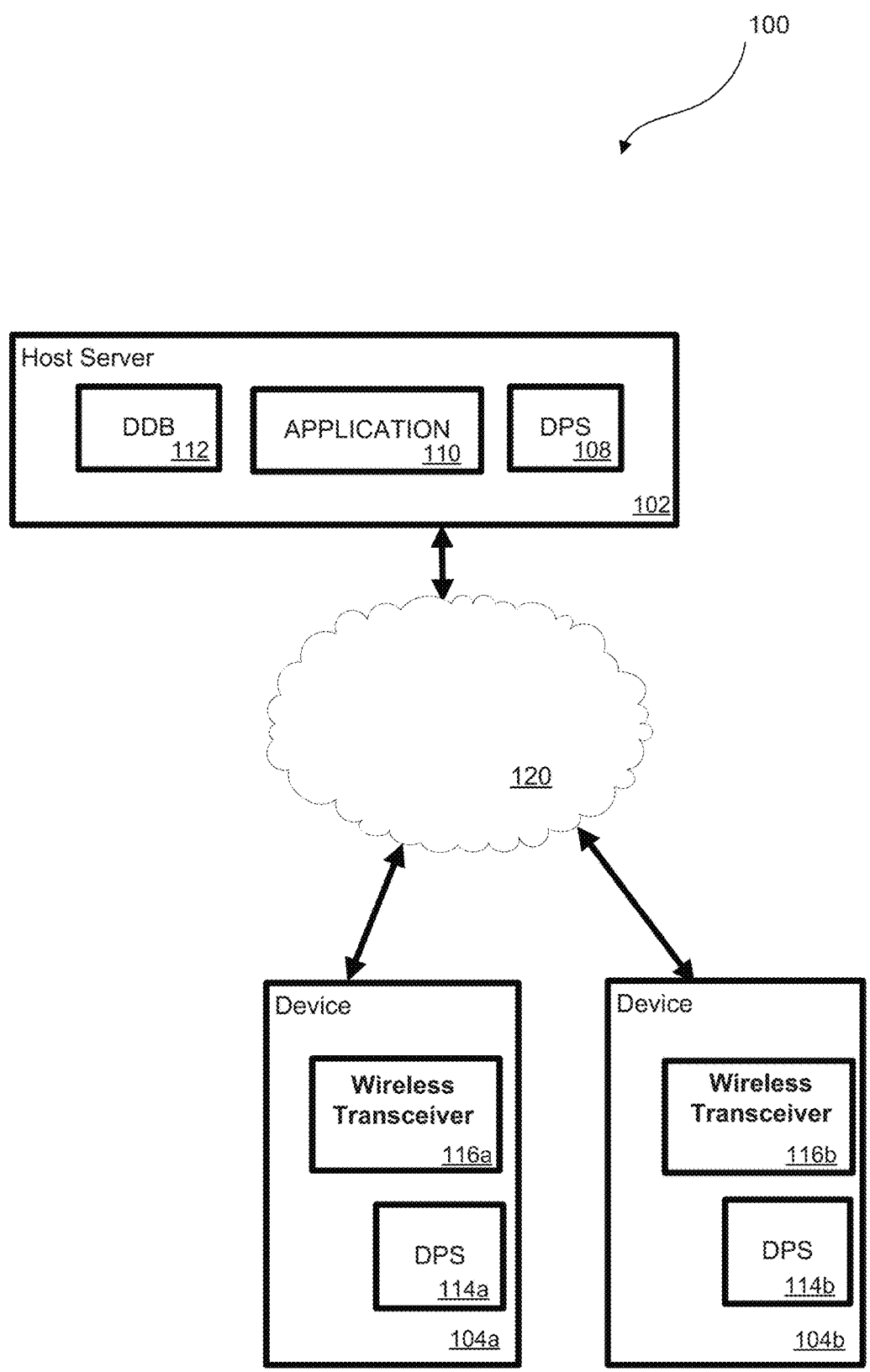
FIG. 1 illustratively represents a system incorporating a host server and a plurality of devices configured for data protection in accordance with the disclosure.

The following acronyms are utilized within the disclosure:
AES—Advanced Encryption Standard
BLE—Bluetooth Low Energy Standard
DDB—Device Data Base (see Definitions section)
DDT—Dynamic Data Token
DKI—Dynamic Key Instance
DPS—Data Protection Server
DSN—Device Serial Number
KCM—Key Creation Material
JTAG—Joint Test Action Group Attention is now directed to FIG. 1, which illustratively represents a system 100 incorporating a host server 102 and a plurality of devices 104 configured for data protection in accordance with the disclosure. As shown, the host server 102 includes a data protection server (DPS) 108, an application 110 and a device database (DDB) 112. Each device 104 also includes a data protection server 114. In one embodiment each device 104 includes a wireless transceiver 116 and, for example, a sensor configured to produce sensor data. The data protection servers 108, 114 each comprise an entity implemented in hardware, firmware, software or any combination thereof that provides the authentication, encryption and decryption services described hereinafter. In one embodiment, the DPS 114 within each device 104 protects data sent by each device 104 to the host server 102 over a network 120. Such data may be sent by the devices 104 at the request of, for example, the application 110 or in order to support operation of the application 110.

Figure 2:
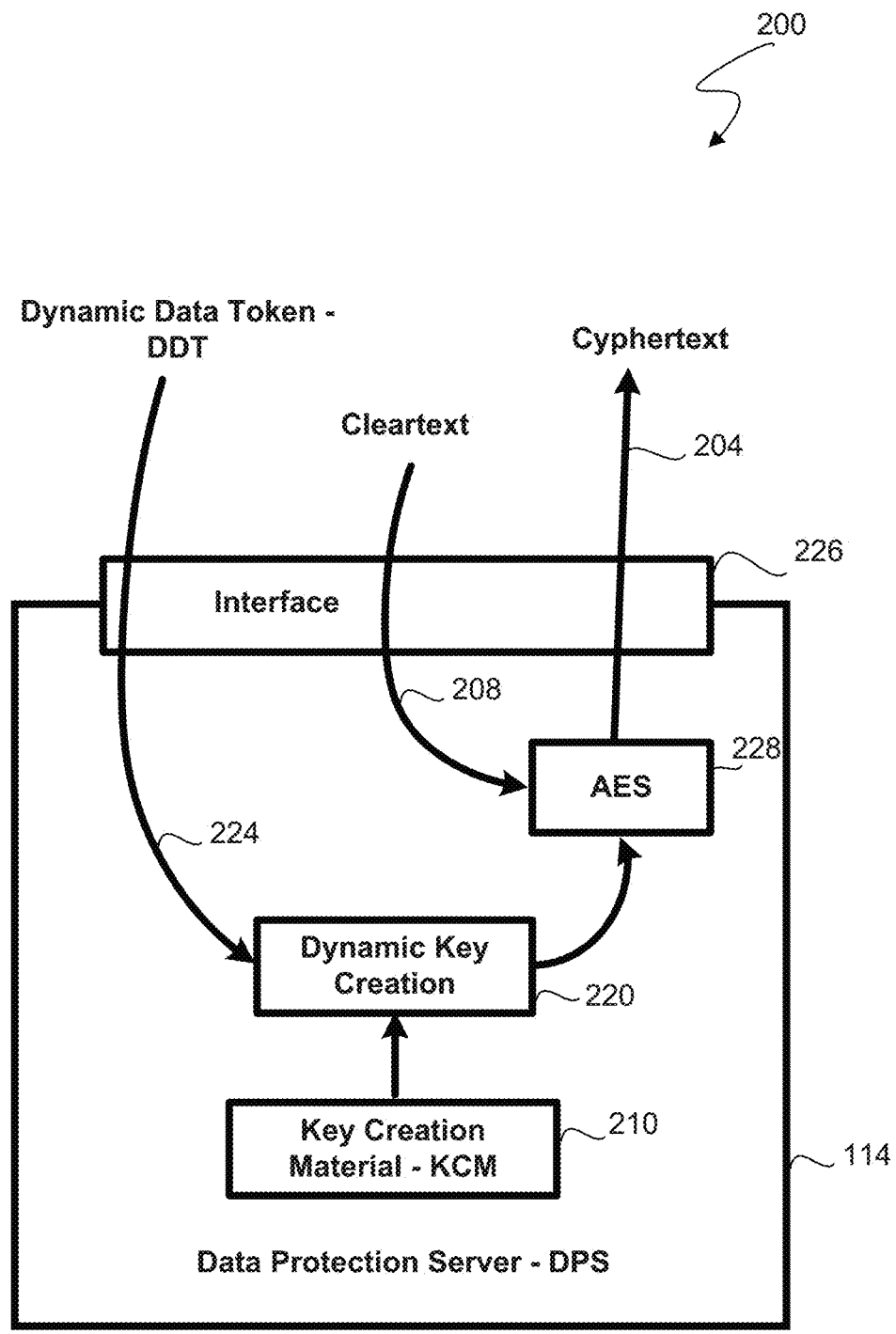
FIG. 2 illustrates a process for generating cyphertext from cleartext using a data protection server in accordance with the disclosure.

In the embodiment of FIG. 1 each wireless transceiver 116 may comprise, for example, a cellular modem or other wide area network transceiver capable of establishing a connection with the host server 102 via the network 120. In such embodiments the network 120 may collectively include one or more wide area networks, a cellular network, and/or the Internet. As is discussed below, in other embodiments the plurality of devices may each include a low-power transceiver designed to communicate with a nearby access point or other wireless node capable of establishing a network connection with a remote host server FIG. 2 illustrates a process 200 for generating cyphertext 204 from cleartext 208 using a DPS in accordance with the disclosure. In typical operation of the system 100, the DPS 108 of the host server 102 creates and sends a dynamic data token (DDT) to one of the devices 104 (stage 224). Upon determining a DDT has been received, the DPS 114 of the device 104 generates a dynamic key instance (DKI) using the DDT and key creation material (KCM) 210 stored in the device 104 (stage 220). Each DKI comprises an orderly collection of elements used as an encryption or decryption key. Any data to be sent by the device 104 is encrypted by the DPS 114 using the DKI so as to create encrypted data (stage 228). The encryption of the cleartext 208 using the DKI may be performed using conventional encryption schemes such as, for example, the Advanced Encryption Standard (AES) algorithm. The encrypted data 204 is then sent to the host server 102 via the wireless transceiver 116 and interface 226. The host server 102 relies upon a corresponding DKI created by the DPS 108 to decrypt the encrypted data.

In one embodiment each DPS may be implemented in hardware using a single integrated circuit including a SPI interface. In this embodiment the only inputs to the IC are DDT and Cleartext and the only output from the IC is Cyphertext. The IC may further include local memory for storing KCM, an AES engine, logic to create DKIs and SPI circuitry.

As is discussed below, the encryption methodologies employed by each DPS require only minimal storage, are computationally efficient and utilize a simple service access protocol. As a consequence, the disclosed encryption techniques are useful for devices having only limited resource such as, for example, wireless sensors and other devices utilized in Internet of Things (IoT) applications.

In one embodiment the device database 112 includes a collection of KCM stored as a function of the serial number or other identifying information of a device 104. In the case in which each device 104 is uniquely identifiable by a device serial number (DSN), the DDB 112 includes a stored collection of DSN[n] and KCM[n] pairs. In some embodiments the DDB 112 may comprise a global DDB containing DSN[n] and KCM[n] pairs for all devices 104 within the system 100. In other embodiments the DDB 112 may be one of a number of other DDBs containing subsets of DSN[n] and KCM[n] pairs. In a typical implementation, a DSN will usually be assigned by a device vendor during manufacturing of the devices 104 and stored within the DDB 112 in association with the KCM respectively associated with the DSN information.

Figure 3:
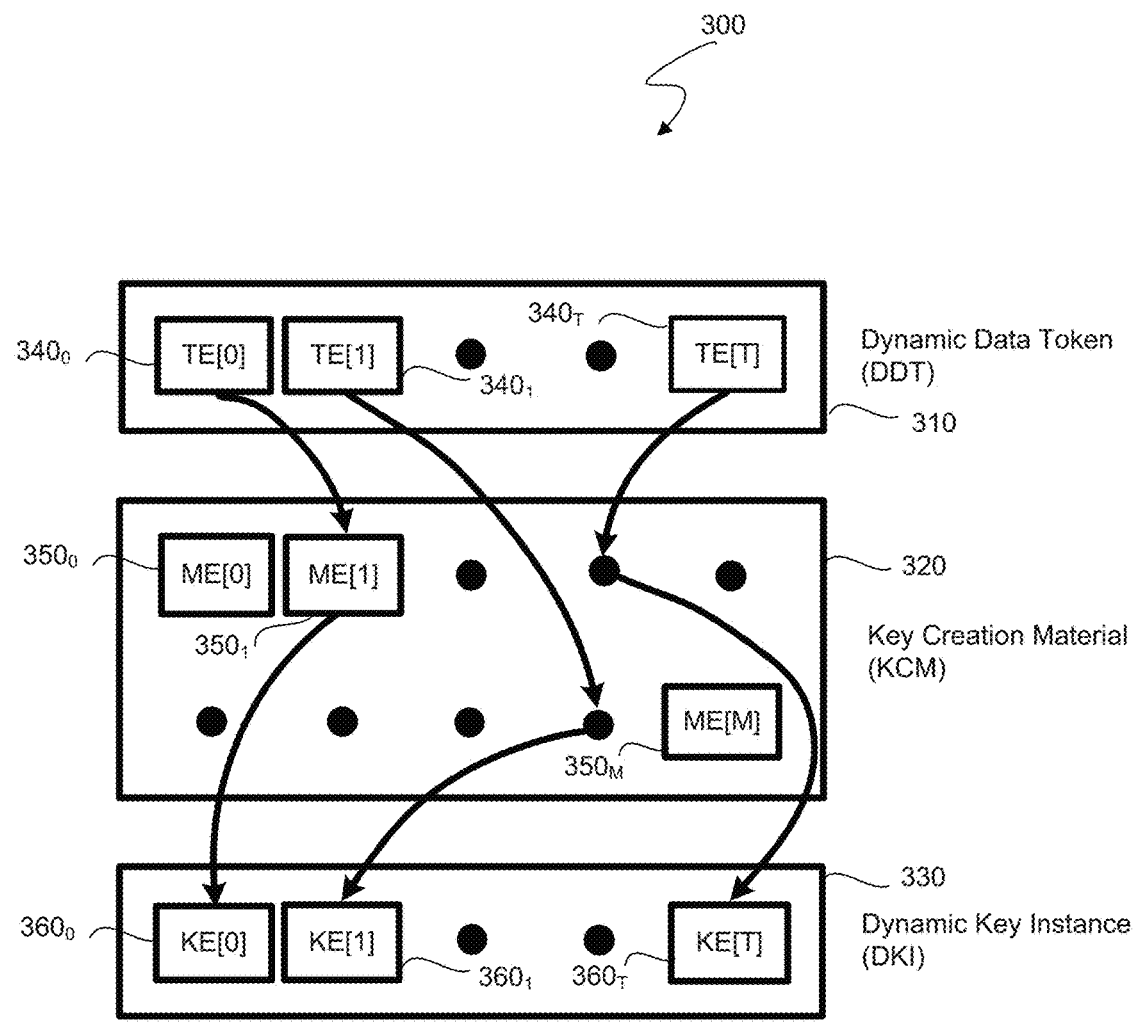
FIG. 3 illustratively represents a process of creating a dynamic key instance.

Attention is now directed to FIG. 3, which illustratively represents a process 300 of creating a DKI 330. Referring to FIG. 3, a DDT 310 is comprised of T+1 elements, ordered from TE[0] ($340_0$) to TE[T] ($340_T$), where each element TE[n] (340) ranges in integer values from 0 to M. As is explained below, the collection of elements TE[n] (340) of the DDT 310 are used with a KCM 320 in the creation of the DKI 330. The DDT 310 may be mathematically represented as:

DDT={TE[0],TE[1] , , , TE[T]}

0<=TE[n]<=M

0<=n<=T

In an exemplary embodiment each element TE[n] (340) of the DDT 310 is independent from the other. As a consequence, some elements TE[n] (340) may have identical values.

Again referring to FIG. 3, the KCM 320 is comprised of M+1 elements, ordered from ME[0] ($350_0$) to ME[M] ($350_M$), where each element ME[n] ranges in integer values from 0 to KE_MAX. Each element ME[n] is stored and addressable and used with a DDT in the creation of a DKI. The DDT 310 may be mathematically represented as:

KCM={ME[0],ME[1] , , , ME[M]}

0<=ME[n]<=KE_MAX

0<=n<=M

In an exemplary embodiment each element ME[n] (350) of the DDT 310 is independent from the other. As a consequence, some elements ME[n] (350) may have identical values.

As shown in FIG. 3, the DKI 330 may include T+1 elements, ordered from KE[0] to KE[T], where each element ranges in integer values from 0 to KE_MAX. In general, the number of elements of the DKI 330 will equal the number of elements included within the DDT 310. The DKI 330 may be mathematically represented as follows:

DKI={KE[0],KE[1] , , , KE[T]}

0<=KE[n]<=KE_MAX

0<=n<=T

The process 300 for creating a unique, single DKI 330 includes receiving a specific DDT 310 at a device 104. Once the DDT 310 has been received, the value of the first element TE[0] ($340_0$) of the DDT 310 determines which element ME[n] of the KCM 320 associated with the device 104 is first read and accessed. In the example of FIG. 3 the value of TE[0] ($340_0$) is assumed to be 1, which results in the value of KCM element addressed by this value, i.e., ME[1] ($350_1$), being assigned to the first element KE[0] ($360_0$) of the DKI 330. Similarly, the value of the second element of DDT (TE[1] ($340_1$) of DDT 310) is used to read the value of the KCM element (ME[x] of KCM 320) addressed by this value. This KCM element value is assigned to the second element of the DKI (KE[1] ($360_1$) of DKI 330). The same procedure repeats for the next element until the last element (TE[T] of DDT 310) is processed. The resulting DKI 330 has the same number of elements as the DDT, with the value of each such element being collected from the KCM 320.

Figure 4:
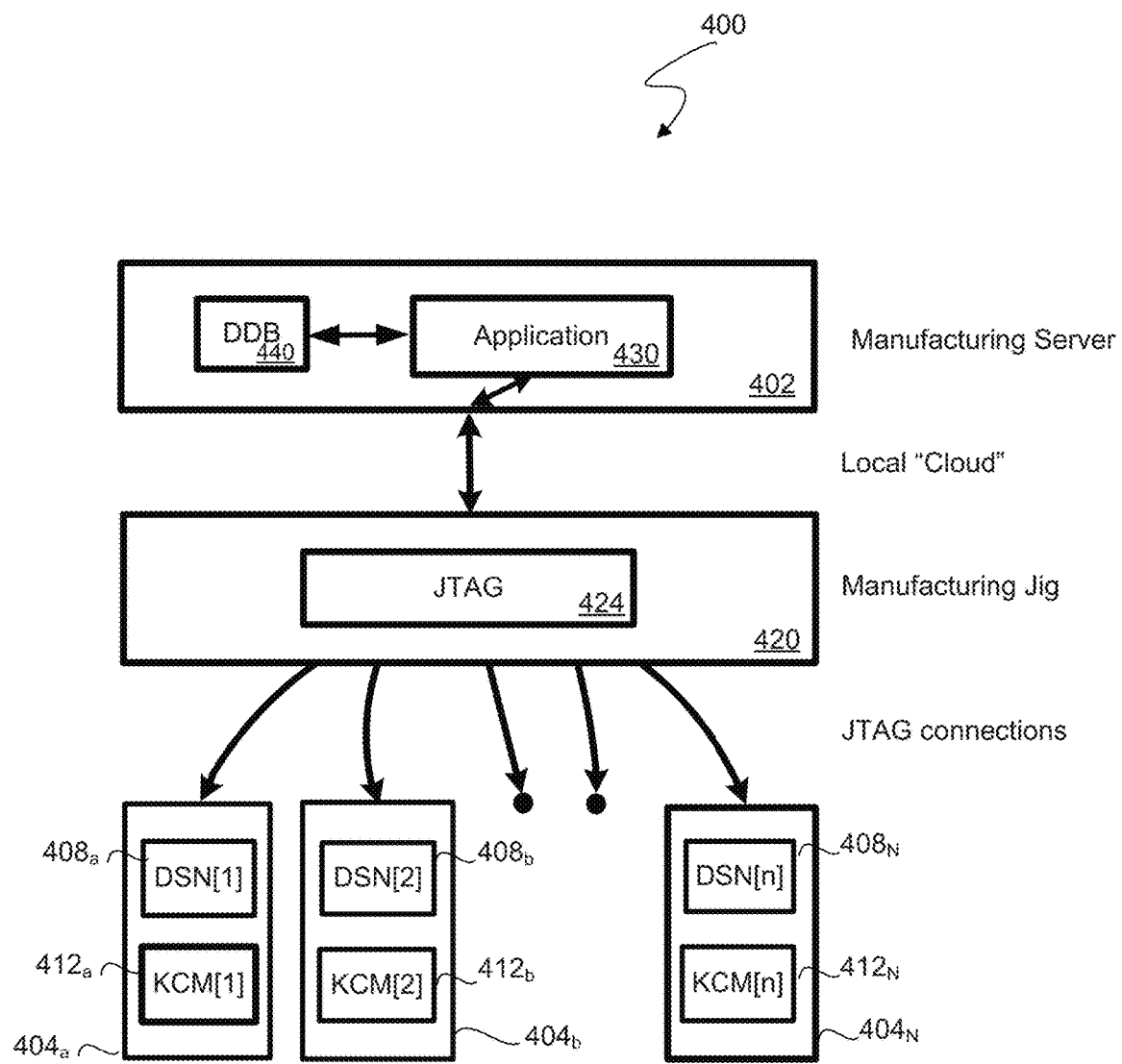
FIG. 4 depicts a process for manufacturing and transferring key creation material to individual devices, such as sensor devices.

Attention is now directed to FIG. 4, which depicts a process 400 for manufacturing and transferring KCM to individual devices 404 such as, for example, sensor devices. In one embodiment a single KCM[x] 412 is stored in a non-volatile memory of a single device 404 via a JTAG interface 424 of a manufacturing jig 420. The same KCM[x] 412 is also stored, under the control of an application 430, in a DDB 440 of a manufacturing server 402. This may be done during manufacturing of multiple devices 404 where each device 404 may have the same or different KCM 412. In this embodiment, a most-likely-unique KCM 412 is generated in the manner described below and stored for each device 404. The DDB 440 stores all pairs of KCMs 412 and DSNs 408 for all manufactured devices.

In one embodiment, a procedure to generate a most-likely-unique KCM may be employed. This procedure may involve storing, into each of 64 (M=63) non-volatile memory elements of the manufacturing server 402, a random integer ranging from 0 to 255 (KE_MAX=255). The size of each such element is generally one byte, i.e., one octet or 8 bits. Accordingly, the total space required for this form of a KCM is 64 bytes. The odds of having two such 64 bytes KCMs with identical values are very low.

In one embodiment, each DDT may be synthesized by using a random number generator to create 16 TE[n] elements (T=15) with values ranging from 0 to 63 (M=63). The ordered collection of these elements comprises single DDT. The odds of picking the same DDT using this procedure are also very low; specifically, the odds are calculated to be one out of 16!, which is equivalent to one out of 2.092279e+13.

Figure 5:
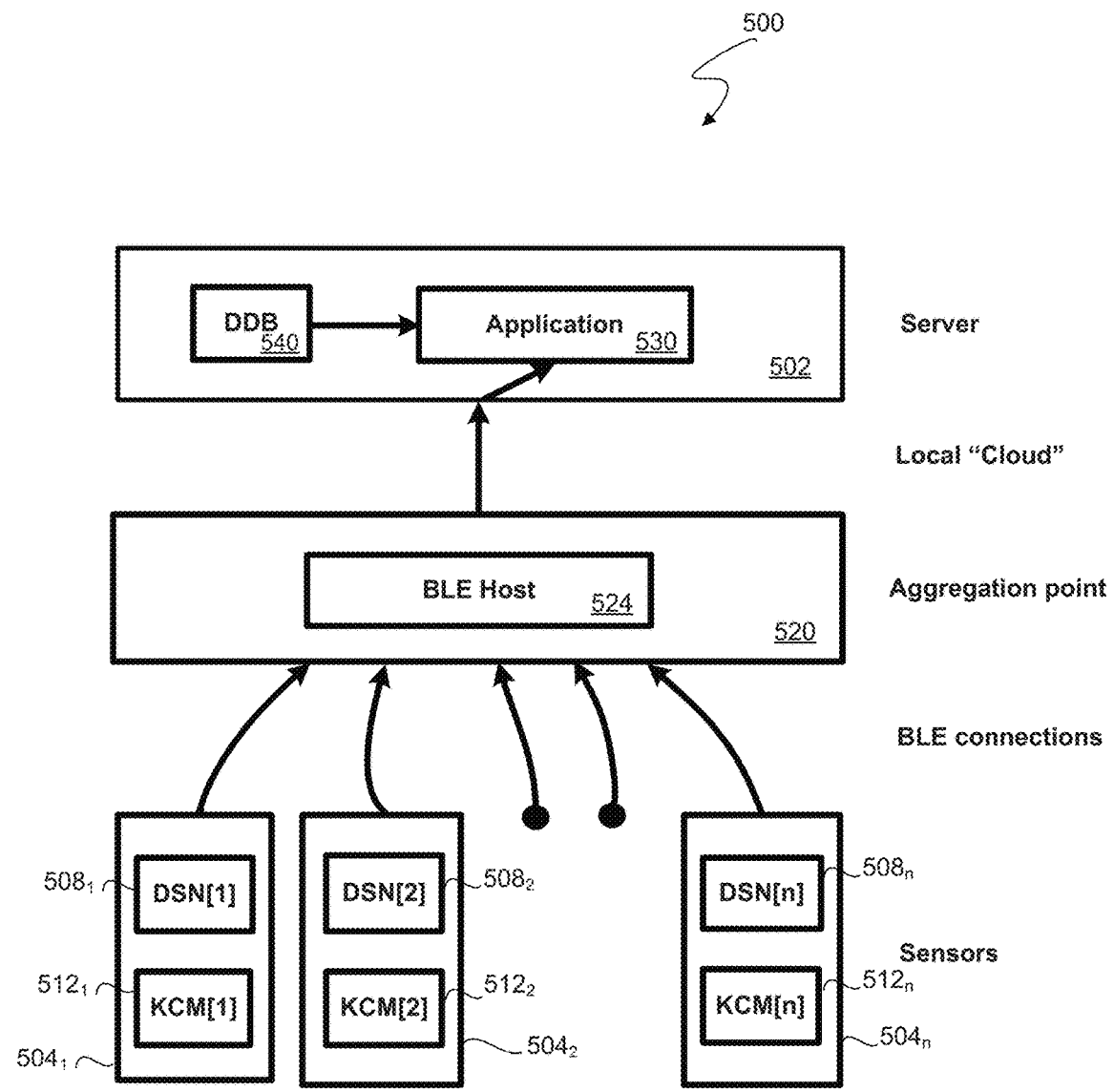
FIG. 5 illustrates a sensor system including a plurality of sensor devices configured in accordance with an embodiment.

Turning now to FIG. 5, there is illustrated a sensor system 500 including a plurality of sensor devices 504 configured in accordance with an embodiment. As shown, the sensors 504 are in wireless communication over Bluetooth Low Energy (BLE) connections with a BLE host 524 instantiated at an aggregation point 520. In one embodiment the BLE host 524 communicates with a local "cloud" comprised of a local application 530 executing on a server component 502 in communication with, or containing, a DDB 540. Each sensor 504 generally has a single KCM stored in flash memory and a unique DSN. The DDB 540 also stores the KCM and unique DSN associated with each sensor 504. The aggregation point 520/BLE host 524 may be configured to appear to the sensor devices 504 as a "BLE Host". In this embodiment each sensor device 504 is connected as a "BLE Peripheral" over one of multiple BLE connections.

In one embodiment each sensor device may include, for example, a Nordic Semiconductor PCA10001 V2.2.0 board as configured as a BLE version 4.0 Peripheral. Similarly, the aggregation point 520/BLE host 524 may be implemented using a Nordic Semiconductor PCA10000 V2.2.0 USB board configured as a BLE version 4.0 Host. The local server 502 may be implemented using a conventional computing device such as, for example, a personal computer (PC) configured with Microsoft Windows 7 or other commercially available operating system. In one embodiment the BLE host 524 may establish with each sensor 504 (based on its DSN[n]) a standard BLE version 4.0 (or later version) Host to Peripheral connection.

During operation of the system 500, the BLE host 524 is configured to authenticate each of a set of n sensor devices 504. The process of authenticating a sensor device 504 having a specific DSN 508 is initiated when the BLE host 524 sends data encrypted in the manner described below ("e-Data[n]") to the device 504. The received e-Data[n] is decrypted, yielding unencrypted data ("Data[n]"). This unencrypted data is manipulated in the manner discussed below to produce manipulated data ("m-Data[n]"). The manipulated data is then encrypted so as to provide encrypted, manipulated data ("e-m-Data[n]"), which is sent to the host for verification.

As part of this authentication process, the BLE host 524 generates a set of [n] DDTs. In one embodiment each such DDT is different from the other DDTs in this set and completely addresses the entire KCM storage area. Moreover, certain KCM locations may be addressed multiple times. These [n] DDTs are then used by the BLE host 524 to generate a corresponding set of [n] challenge data blocks, i.e., the e-Data[n] elements. Each challenge data block is different from the other data blocks in this set.

Considering now the details of an exemplary authentication process, the following authentication protocol may be executed between the BLE Host 524 and each sensor 504 being authenticated:
1—BLE Host 524 sends, encrypted with DDT[1], e-Data [1] and DDT[1] to sensor 504.
2—Sensor 504 decrypts e-Data[1], using DDT[1], into Data[1].
3—Sensor 504 manipulates Data[1] in a pre-determined way:
  3A—Each Data[1] byte is reversed into m-Data[1].
4—Sensor 504 sends, encrypted with DDT[1], e-m-Data [1] to BLE Host 524.
5—BLE Host 524 decrypts e-m-Data[1], with DDT[1], into m-Data[1].
6—BLE Host 524 verifies that m-Data[1] corresponds to Data[1].
7—Above steps repeat for the rest of the set.
8—Authentication of sensor 504 verified if all m-Data blocks correspond to original Data blocks.

Figure 6:
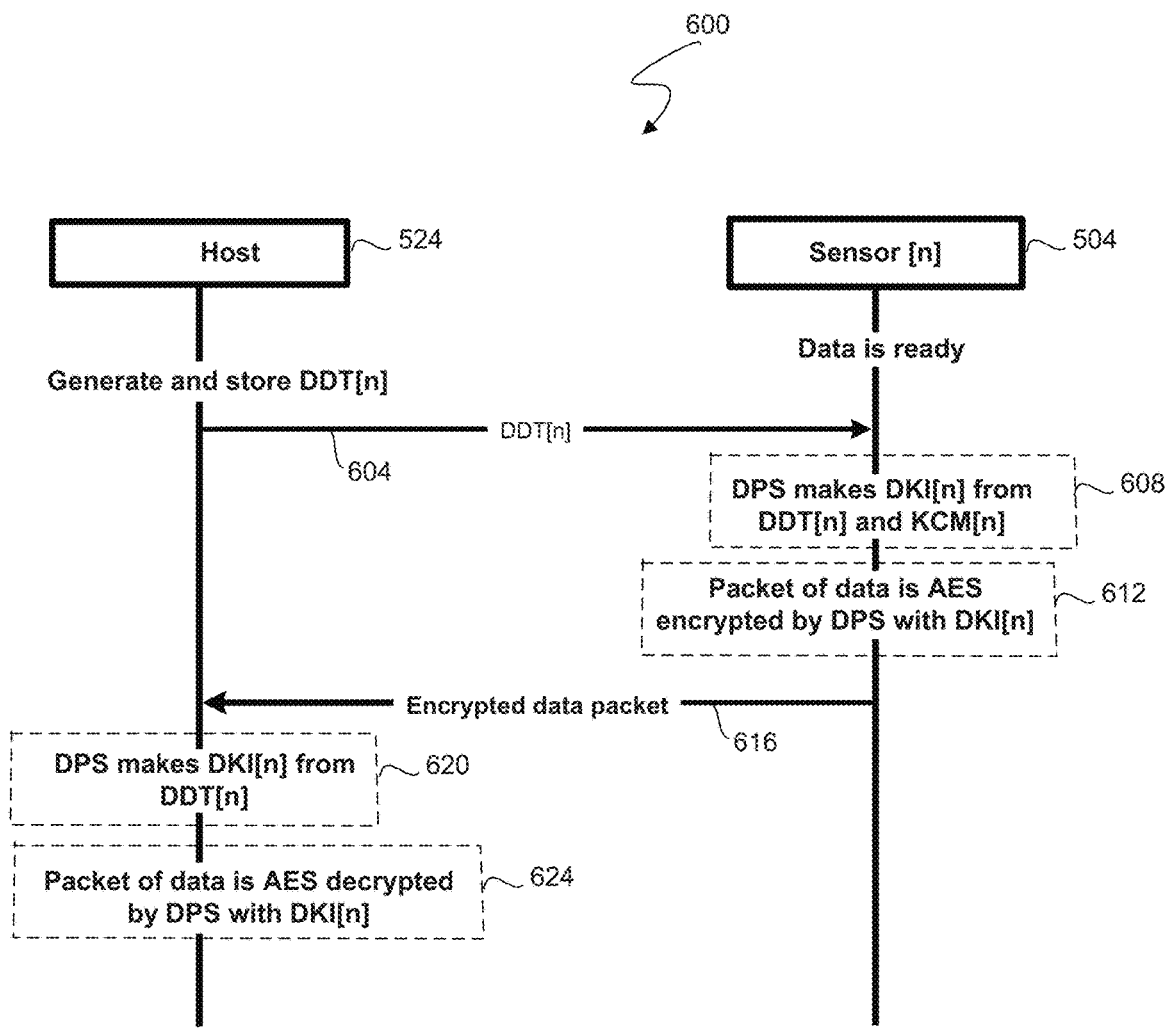
FIG. 6 illustrates an exemplary message sequence between a BLE host and one of a set of sensors.

Referring now to FIG. 6, there is illustrated an exemplary message sequence 600 between the BLE host 524 and one of the participating sensors 504. As shown, the BLE Host 524 sends a DDT[n] to the sensor 504 with DSN[n], where n corresponds to the one of the participating sensors 504 (stage 604). In the case of the first DDT[n] which is sent (i.e., DDT[1]) by the BLE host 524 to the participating sensor 504, the sensor 504 uses that DDT[1] to generate DKI[1] using KCM[n] (stage 608). The sensor 504 in turn and uses DKI[1] to encrypt the $1^{st}$ packet of data to be sent to the BLE host 524 by the sensor 504 (stage 612). In one embodiment DKI[1] is used as the key for 128-AES encryption performed during stage 612. The sensor 504 then transmits the encrypted data packet to the BLE host 524 (stage 616). Upon receiving this encrypted packet, the BLE Host 524 uses DDT[1] to generate DKI[1] (stage 620). The resulting DKI[1] is then in turn used to decrypt the $1^{st}$ packet of data (stage 624). In one embodiment DKI[1] is used by the BLE host 524 as a key for 128-AES decryption during stage 624. Stages 604 though 624 are then repeated with respect to each new DDT[n] until the sensor 504 has completed transmitting all data desired to be conveyed to the BLE host 524.

Figure 7:
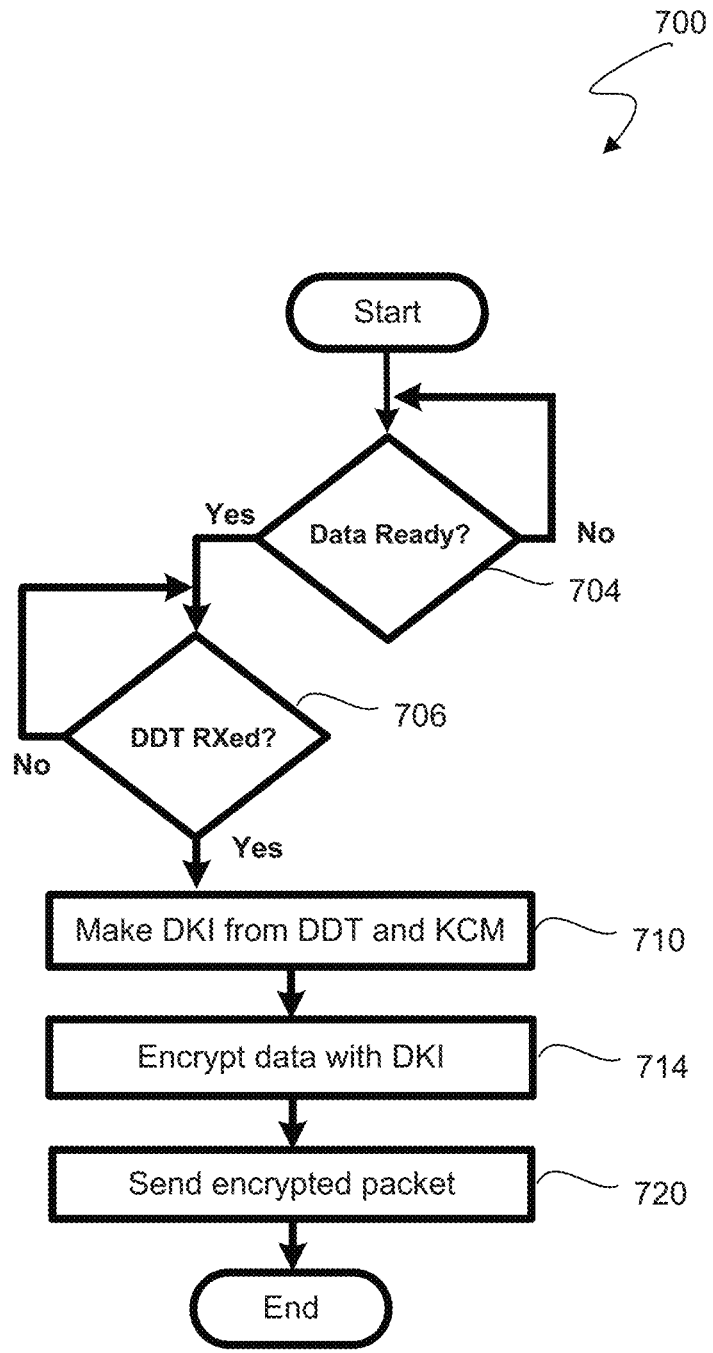
FIG. 7 is a flowchart of an exemplary encryption process carried out by a device configured with a data protection server.

Turning now to FIG. 7, a flowchart is provided of an exemplary encryption process 700 carried out by a device configured with a DPS. In the example of FIG. 7 the device is in communication with another entity capable of sending one or more DDTs to the device and receiving one or more correspondingly encrypted data packets from the device. When the device has data to send to the other entity (stage 704), it checks to determine if it has received a DDT from the host and waits for a DDT if none have yet been received (stage 706). Once a valid DDT has been received and the device has data to send to the host, the device DPS generates a DKI from the received DDT and the KCM associated with the device (stage 710). The DPS then encrypts the data using the DKI (stage 714) and presents it to the device. The device then sends the resulting encrypted data packet upstream to the other entity (stage 720).

Figure 8:
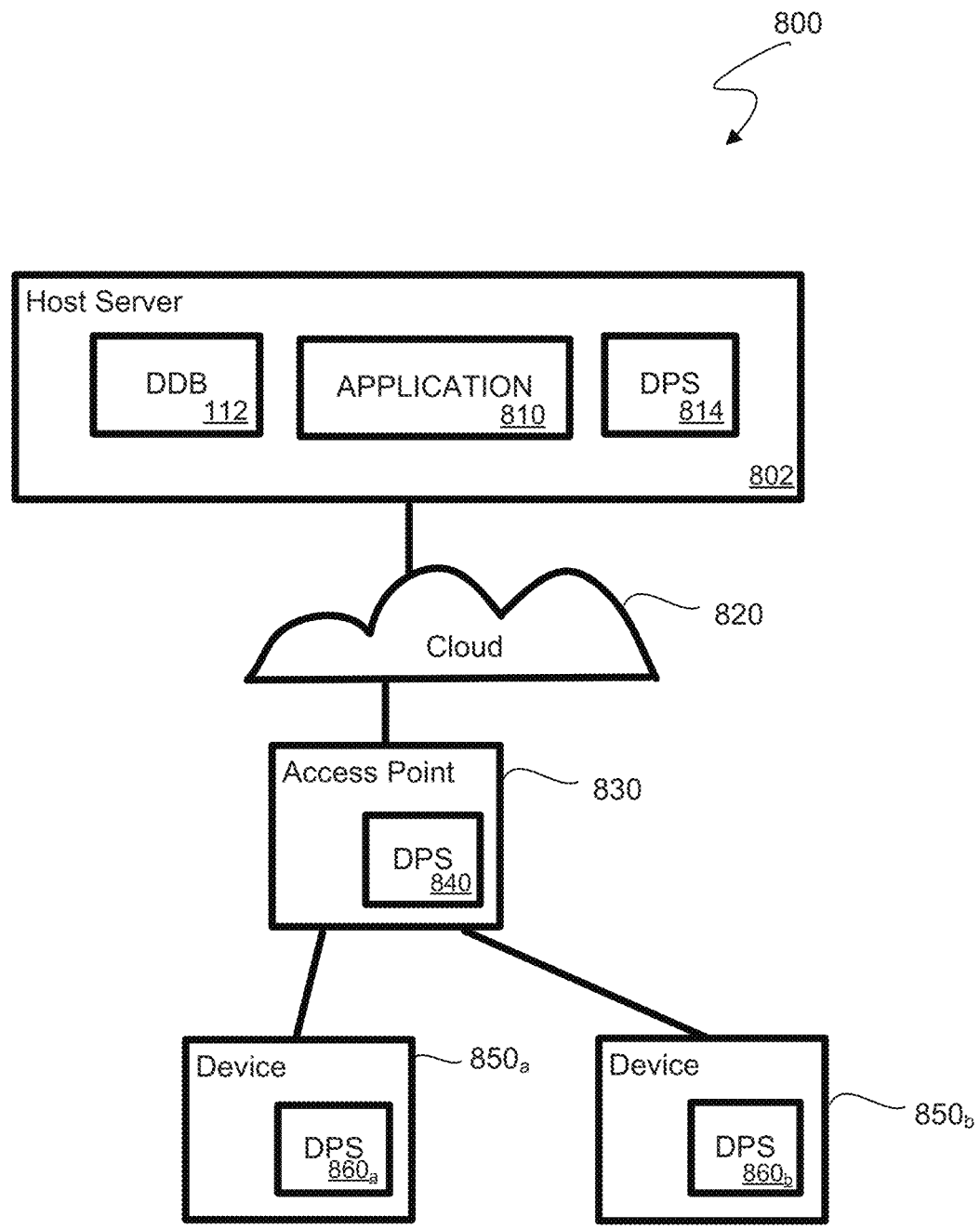
FIG. 8 illustratively represents a system incorporating a host server, an access point, and a plurality of devices configured for data protection in accordance with the disclosure.

Attention is now directed to FIG. 8, which illustratively represents a system 800 incorporating a host server 802, an access point 830, and a plurality of devices 850 configured for data protection in accordance with the disclosure. In one embodiment each device 850 includes a wireless transceiver and, for example, a sensor configured to produce sensor data. As is discussed below, the embodiment of FIG. 8 is particularly useful in applications involving, for example, the Internet of Things (IoT) and other applications in which an economical and secure deployment is desired.

As shown, the host server 802 includes a DPS 814, an application 810 and a DDB 812. Each device 850 also includes a data protection server 860. During operation, each device 850 receives DDTs from a DPS 840 of the access point 830 and uses its local DPS 860 to generate secure data in the manner discussed above. That secure data is then transferred to the access point 830, at which it is decrypted by the DPS 840. In like manner the access point 830 receives DDTs from the DPS 814 associated with the application 810. This enables the DPS 840 of the access point 830 to encrypt and transfer the data received from the devices 850 to the DPS 814 through a network represented as cloud 820. Application 810 may use DPS 814 to authenticate the access point 830 and the devices 850 in the manner described herein. The DPS 814 also decrypts the encrypted data received from the access point DPS 840.

The system 800 is designed to support a number of specific use cases. For example, the system 800 may form part of a home security system in which the devices 850 comprise security devices connected to access point 830 via Bluetooth protocols. In this case the devices 850 may include sensors and actuators such as, for example, door locks, occupancy detectors, fire and smoke detectors, glass shutter sensors, temperature and humidity sensors and so on. In one home security implementation the access point 830 continuously communicates with the devices 850 via Bluetooth using the secure DPS protocol described herein. The access point 830 may be connected to the "cloud" 820 via on-board cellular modem. The connectivity to the "cloud" 820 can be done in many other ways: [1] WiFi to local router, [2] Ethernet to Cable Modem local port, [3] Thread protocol to Thread Master and more. In this embodiment the host server 802 may be in the form of, for example, a "home security service center" where monitoring for alerts and the like takes place based upon the data securely received from the devices 850.

In another use case the system 800 may form part of a payment system in which the devices 850 comprise "smart" plastic cards and the access point 830 comprises a point of sale (POS) terminal. Each device 850, i.e., "smart" plastic card, includes on-board DPS 860 in communication with the DPS 840 of the access point 830, i.e., the POS. It is noted that replicating a "smart" plastic payment card having an on-board DPS is believed to be orders of magnitude more difficult than replicating smart cards secured using conventional means. Essentially any smart or other payment card capable of including a DPS may be protected. Moreover, all types of communication with a POS utilized by such cards (e.g., magnetic strip, Near Field Communication (NFC) and Bluetooth) may also be protected using the disclosed DPS security protocol.

The system 800 may also be utilized in connection with the management of retail beacons. In this embodiment a large retailer may employ numerous inexpensive, low power communicating devices 850 throughout the store floor. These devices 850 communicate with an Access Point 830 that is part of the local management system and configured with a DPS 840. These devices 850 may display items prices and managed by the store. The authenticity of these devices 850 is verified via on-board DPS 860 in order to prevent, for example, a situation where the retailer may purchase additional devices made by an unlicensed vendor.

In yet another use case the system 800 may be utilized in transportation and product distribution applications such as, for example, in connection with the continuous authentication of high value containers. Such containers may include high value medication or other high value goods stored in secure containers for distribution. The identity of a container is supported by active RFID devices with DPS on-board. The authenticity of these containers is maintained throughout the distribution chain with the use of DPS. The low overhead and correspondingly low power consumption of the disclosed DPS security protocol is believed to be particularly advantageous in applications involving active RFID devices, which tend to have limited power capabilities (e.g., power may be provided by small batteries or energy harvesting).

Figure 9:
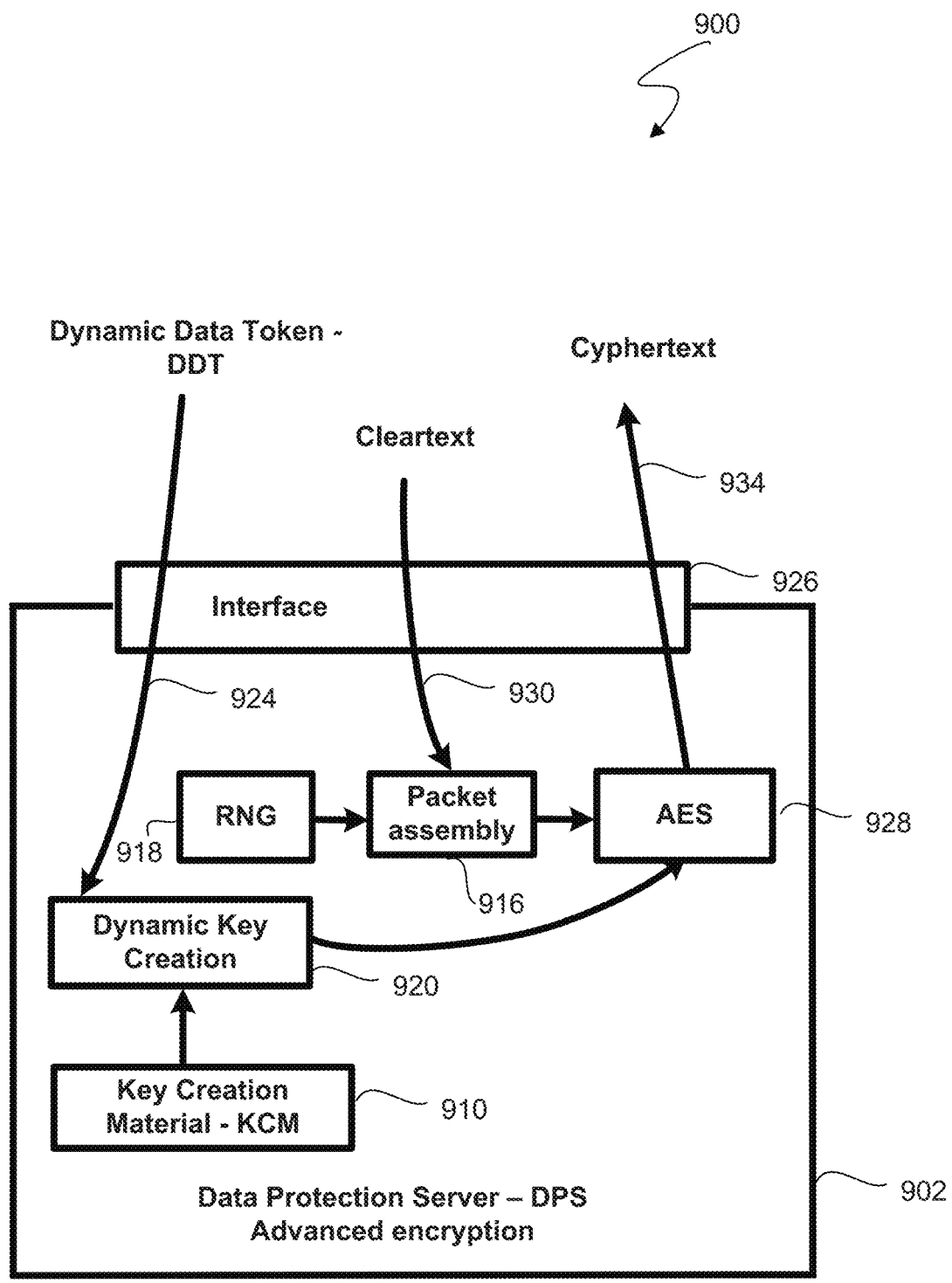
FIG. 9 illustrates an alternative process for generating cyphertext from cleartext using a data protection server in accordance with the disclosure.

Attention is now directed to FIG. 9, which illustrates an alternative process 900 for generating cyphertext 934 from cleartext 930 using a DPS 902 in accordance with the disclosure. The alternative process 900 is similar to the process 200, but includes additional complexity to enhance data protection. In one embodiment the DPS 902 may include a packet assembly module 916, a random number generator 918, increment only counters (not shown) and other security enhancement circuitry and methods. In cases in which, for example, the cleartext 930 is sensor data or other data that does not typically change from packet to packet, a potential security vulnerability is created. This may be alleviated by using the packet assembly module 916 to create new packets including the cleartext 930 and random data from the random number generator 918.

As shown in FIG. 9, a dynamic data token (DDT) sent by an entity is received by a device including a DPS 902 (stage 924). Upon determining a DDT has been received, the DPS 902 generates a dynamic key instance (DKI) using the DDT and key creation material (KCM) 910 stored by the DPS 902 of the device 104 (stage 920). Each DKI comprises an orderly collection of elements used as an encryption or decryption key. Any data to be sent by the device is encrypted, using the DKI, so as to create encrypted data (stage 928). The encryption of the cleartext 930 using the DKI may be performed using conventional encryption schemes such as, for example, the Advanced Encryption Standard (AES) algorithm. The encrypted data 204 is then sent to the host server 102 via an interface 226, which relies upon a corresponding DKI created by the DPS 108 to decrypt the encrypted data. In one embodiment the device may include extra storage and firmware in order to protect from attacks using repeat DDTs intended to, for example, discover the KCM.

Figure 10:
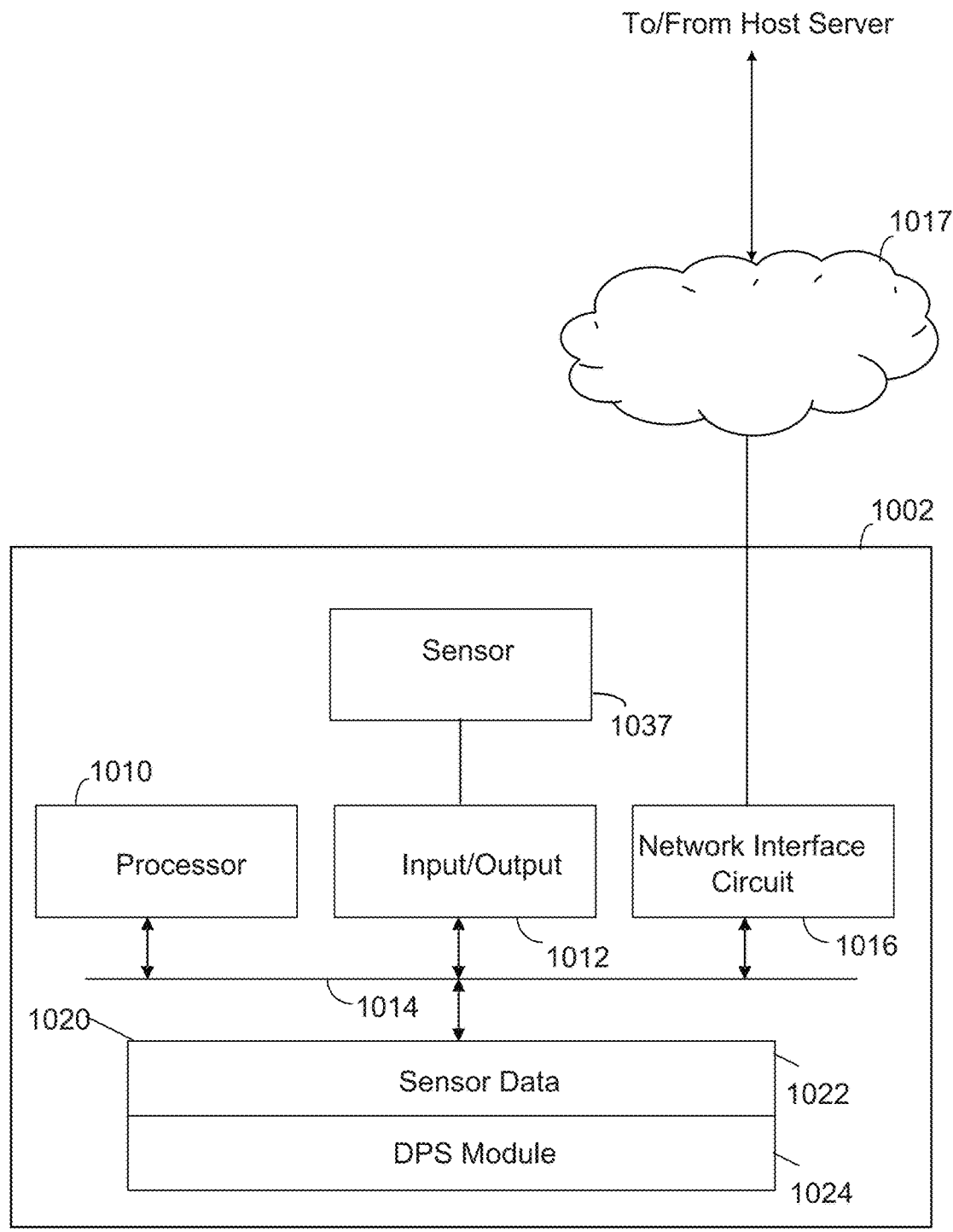
FIG. 10 is a block diagram of an exemplary sensor device configured to implement a security protocol in accordance with an embodiment.

FIG. 10 illustrates an exemplary sensor device 1002 configured to implement the DPS security protocol in accordance with an embodiment. The device 1002 includes standard components such as a processor 1010 connected to input/output devices 1012 via a bus 1014. The processor 1010 can be a general purpose processor, a Field Programmable Gate Array (FPGA), an Application Specific Integrated Circuit (ASIC), a Digital Signal Processor (DSP), and/or the like. The input/output devices 1012 may include a sensor 1037, General Purpose IO (GPIO) (not shown) and the like. A network interface circuit 1016 is also connected to the bus 1014 to provide connectivity to a network 1017. A memory 1020 is also connected to the bus 1014. The memory 1020 includes sensor data 1022 collected by the sensor 1037 and instructions executed by the processor 1010. In particular, a DPS module 1024 is stored in memory 1020. The DPS module 1024 includes instructions to implement the DPS security protocol disclosed herein. Alternately, the operations disclosed herein may be distributed across a number of machines of the type shown in FIG. 10.

The memory 1020 can be, for example, any type of non-volatile memory device, a random access memory (RAM), a memory buffer, a hard drive, a database, an erasable programmable read-only memory (EPROM), an electrically erasable read-only memory (EEPROM), a read-only memory (ROM) and/or so forth. It is understood that although a single memory 1020 is illustrated, the memory 1020 may comprise one or more separate memory devices. For example, in order to enhance security the DPS module 1024 could be instantiated in a physically separate and secure memory. Alternatively, the DPS module 1024 could comprise a separate integrated circuit including dedicated processing and memory resources. Alternatively, the DPS module 1024 can be part of an integrated secure zone of a security process IC.

Figure 11:
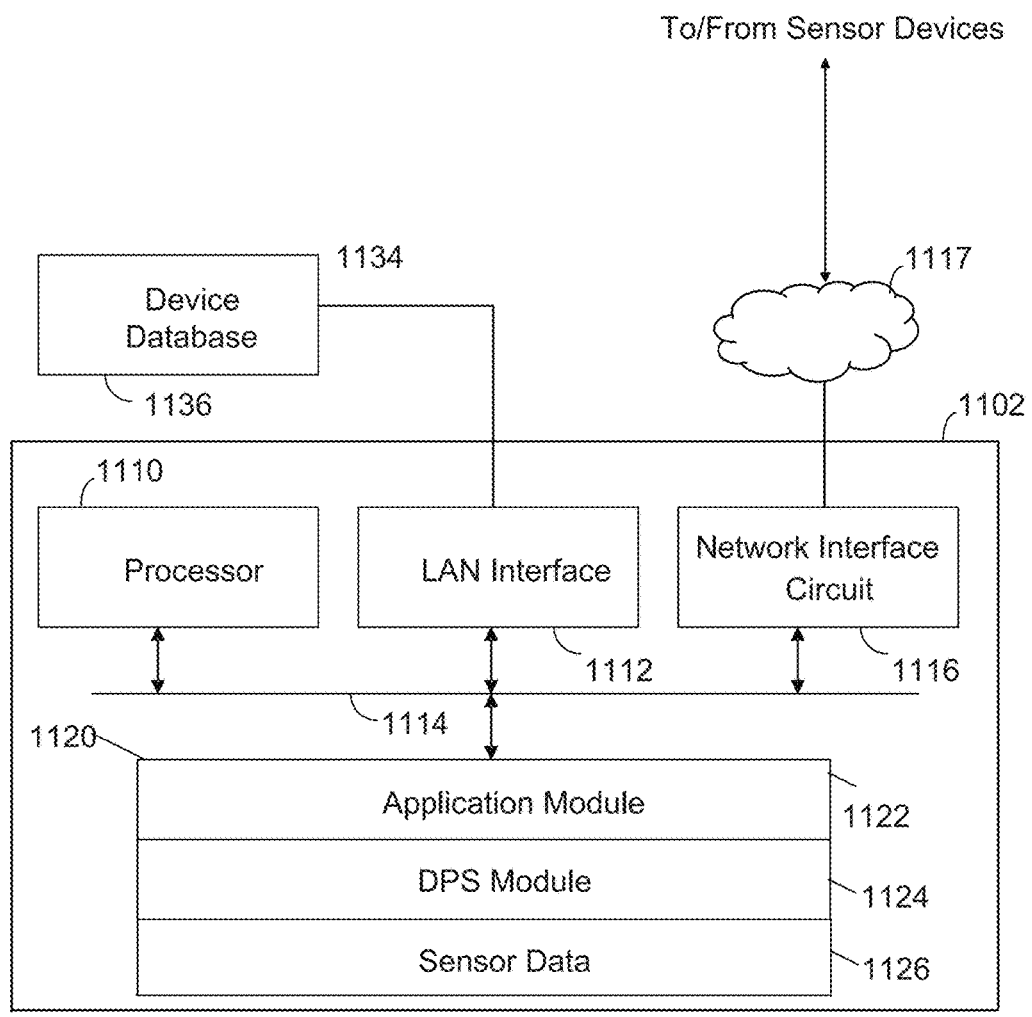
FIG. 11 is a block diagram of an exemplary host server configured to implement a security protocol in accordance with an embodiment.

Referring now to FIG. 11, there is illustrated an exemplary host server 1102 configured to implement the DPS security protocol in accordance with an embodiment. The server 1102 includes standard components such as a processor 1110, a LAN interface 1112 and a network interface circuit 1116 mutually connected via a bus 1114. The LAN interface 1112 enables the host server 1102 to communicate with a DDB 1134 and the network interface circuit 1116 provides connectivity to a network 1117. A memory 1120 is also connected to the bus 1114. The memory 1120 includes instructions executed by the processor 1110 including an application module 1122 and a DPS module 1124. During operation, the processor executes the DPS module 1124 when requested by the application module 1122. The DPS module 1124 produces decrypted sensor data 1126 in response to encrypted sensor data received via the network interface circuit 1116 from one or more sensor devices. Again, the DPS module 1124 could be located in physically separate and secure memory or, alternatively, could be implemented using a dedicated integrated circuit.

It should be noted that although the exemplary embodiments tend to describe a unidirectional flow of DPS-protected data (i.e., from a "host" to a "client"), the roles of "host" and "client" are interchangeable with respect to pairs of devices in communication. That is, a given device may function as a client at certain times (and encrypt data using a DPS) and that same device may function some of the time as a host (and decrypt data using a DPS). Although in the case of a sensor device functioning as a DPS client the sensor device may collect data, encrypt it, and send it to the host, in many instances the host is required to manage the sensor. Accordingly, when sending instructions to a sensor device a host may function as a DPS client and DPS-encrypt such instructions before sending them to the client device. Moreover, a sensor device will typically act to authenticate a host (in essentially the same manner as the host authenticates the sensor device) before acting on management directives from a host.

Such mutual authentication may be even more important in other applications such as, for example, those involving payment cards and POS terminals. In such embodiments a fully-featured DPS supporting both client and host roles may be instantiated on both the payment card and the POS terminal.

Figure 12:
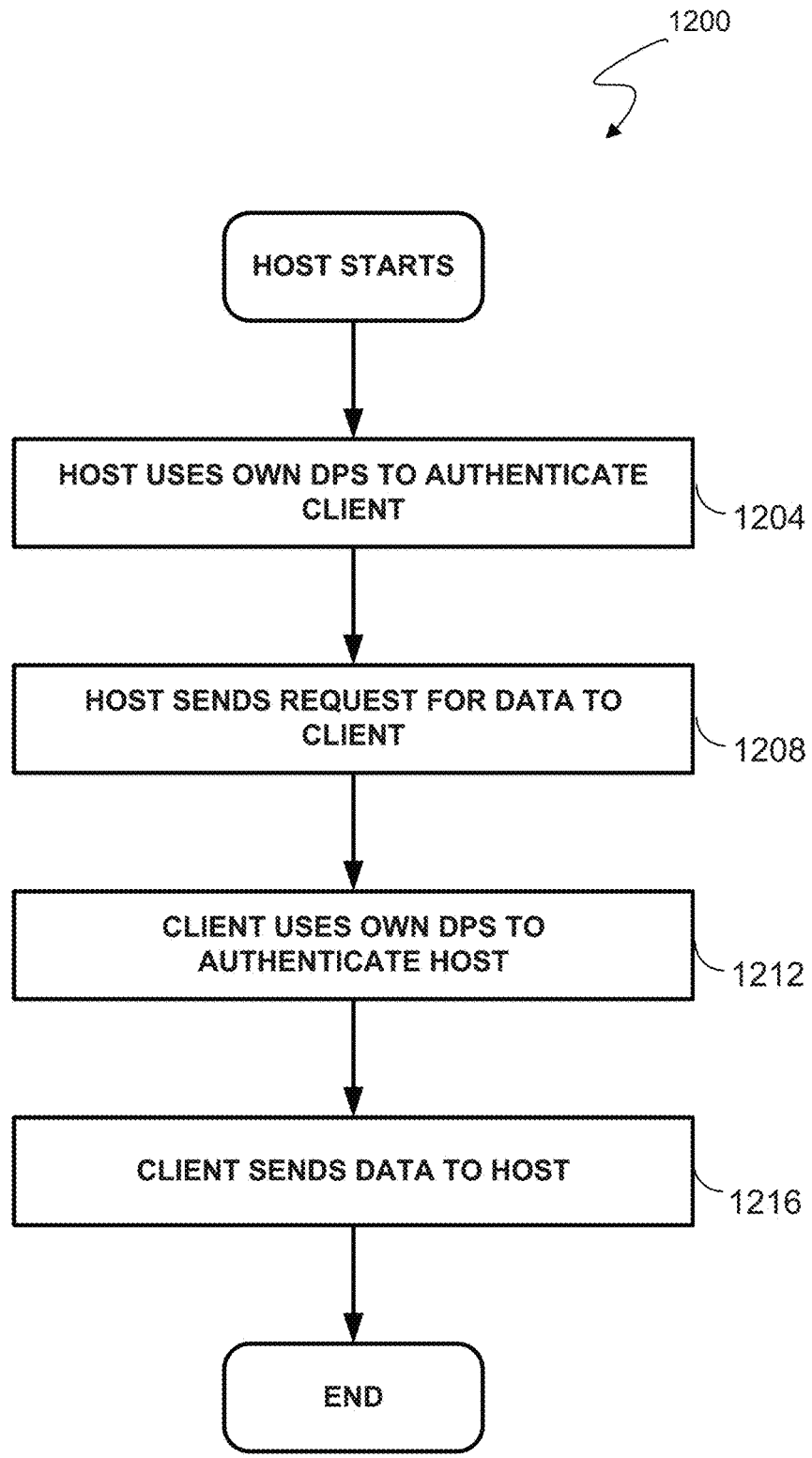
FIG. 12 is a flowchart of a process for mutual DPS authentication in accordance with the disclosure.

Referring now to FIG. 12, a flowchart is provided of a process 1200 for mutual DPS authentication in accordance with the disclosure. As shown, the process begins when a host entity uses its own DPS to authenticate a client entity in the manner described above with reference to FIG. 5 (stage 1204). The host entity then sends a request for data to the client entity (stage 1208). In response to the request, the client uses its own DPS to authenticate the host in the manner described above with reference to FIG. 5 (stage 1212). Once the host has been successfully authenticated the client sends the requested data to the host (stage 1216).

As used in this specification, a module can be, for example, any assembly and/or set of operatively-coupled electrical components associated with performing a specific function(s), and can include, for example, a memory, a processor, electrical traces, optical connectors, software (that is stored in memory and/or executing in hardware) and/or the like.

As used in this specification, the singular forms "a," "an" and "the" include plural referents unless the context clearly dictates otherwise. Thus, for example, the term "an actuator" is intended to mean a single actuator or a combination of actuators.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but can be implemented using a variety of alternative architectures and configurations. Additionally, although the invention is described above in terms of various embodiments and implementations, it should be understood that the various features and functionality described in one or more of the individual embodiments are not limited in their applicability to the particular embodiment with which they are described, but instead can be applied, alone or in some combination, to one or more of the other embodiments of the invention, whether or not such embodiments are described and whether or not such features are presented as being a part of a described embodiment. Thus the breadth and scope of the present invention should not be limited by any of the above-described embodiments.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media in which the KCM may reside include, without limitation, one time programmable (OTP) memory, protected Random-Access Memory (RAM) and flash memory.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above. Although various modules in the different devices are shown to be located in the processors of the device, they can also be located/stored in the memory of the device (e.g., software modules) and can be accessed and executed by the processors. Accordingly, the specification is intended to embrace all such modifications and variations of the disclosed embodiments that fall within the spirit and scope of the appended claims.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of" will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of" or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A computer-implemented method for data protection, the method comprising:
   determining that a dynamic data token (DDT) has been received, the DDT including a plurality of DDT elements;
   generating a dynamic key instance (DKI) using the DDT and key creation material (KCM) including a plurality of KCM elements wherein the KCM is randomly generated, the DKI including an ordered combination of integer values corresponding to KCM elements included within the plurality of KCM elements wherein the generating includes, for each of the plurality of DDT elements, selecting at least one of the plurality of KCM elements addressed by a value of the one of the plurality of DDT elements;
   encrypting, using the DKI, data so as to create encrypted data; and
   sending a data packet including the encrypted data.

2. The method of claim 1 wherein the KCM is associated with a device serial number (DSN) of a device, the method including storing the KCM within a non-volatile memory of the device.

3. A computer-implemented method for data protection, the method comprising:
   determining that a dynamic data token (DDT) has been received, the DDT including a plurality of DDT elements;
   generating a dynamic key instance (DKI) using the DDT and key creation material (KCM) including a plurality of KCM elements, the DKI including an ordered combination of integer values corresponding to KCM elements included within the plurality of KCM elements;
   receiving data from a device wherein the KCM is associated with device identifying information of the device wherein the device is a sensor;
   encrypting, using the DKI, the data so as to create encrypted data; and
   sending a data packet including the encrypted data.

4. An electronic device arrangement, comprising:
   a processor;
   a wireless transceiver;
   an electronic device configured to produce data;
   a memory including program code for a data protection server which, when executed, causes the processor to:
      determine that a dynamic data token (DDT) has been received by the wireless device, the DDT including a plurality of DDT elements;
      generate a dynamic key instance (DKI) using the DDT and key creation material (KCM) including a plurality of KCM elements wherein the KCM is randomly generated, the DKI including an ordered combination of integer values corresponding to KCM elements included within the plurality of KCM elements wherein the DKI is generated by, for each of the plurality of DDT elements, selecting at least one of the plurality of KCM elements addressed by a value of the one of the plurality of DDT elements;
      receive the data from the electronic device;
      encrypt, using the DKI, the data so as to create encrypted data; and
      instruct the wireless transceiver to send a data packet containing the encrypted data.

5. The device of claim 4 wherein the KCM is associated with a device serial number (DSN) of a device, the program code including code for causing the process to store the KCM within a non-volatile memory of the device.

6. The device of claim 4 wherein the memory includes non-volatile memory, the KCM being stored within the non-volatile memory.

7. An electronic device arrangement, comprising:
a processor;
a wireless transceiver;
an electronic device configured to produce data wherein the electronic device is a sensor;
a memory including program code for a data protection server which, when executed, causes the processor to:
  determine that a dynamic data token (DDT) has been received by the wireless device, the DDT including a plurality of DDT elements;
  generate a dynamic key instance (DKI) using the DDT and key creation material (KCM) including a plurality of KCM elements, the DKI including an ordered combination of integer values corresponding to KCM elements included within the plurality of KCM elements;
  receive the data from the electronic device;
  encrypt, using the DKI, the data so as to create encrypted data; and
  instruct the wireless transceiver to send a data packet containing the encrypted data.

8. A computer-implemented method for data protection, the method comprising:
  determining that a dynamic data token (DDT) has been received, the DDT including a plurality of DDT elements;
  generating a dynamic key instance (DKI) using the DDT and key creation material (KCM) including a plurality of KCM elements, the DKI including an ordered combination of integer values corresponding to KCM elements included within the plurality of KCM elements;
  encrypting, using the DKI, data so as to create encrypted data;
  sending a data packet including the encrypted data; and
  executing a portion of an authentication protocol, the executing including:
    (1) receiving encrypted data (e-Data[i]) and a DDT[i];
    (2) decrypting the e-Data[i]) using DDT[i], thereby generating Data[i];
    (3) manipulating Data[i], thereby generating m-Data[i];
    (4) encrypting m-Data[i] using DDT[i], thereby generating e-m-Data[i]
    (5) sending e-m-Data[i] to a host configured to verify that m-Data[i] corresponds to Data[i];
    (6) repeating operations (1) through (5) for i=1 to m, where m is greater than one.

9. An electronic device arrangement, comprising:
a processor;
a wireless transceiver;
an electronic device configured to produce data;
a memory including program code for a data protection server which, when executed, causes the processor to:
  determine that a dynamic data token (DDT) has been received by the wireless device, the DDT including a plurality of DDT elements;
  generate a dynamic key instance (DKI) using the DDT and key creation material (KCM) including a plurality of KCM elements, the DKI including an ordered combination of integer values corresponding to KCM elements included within the plurality of KCM elements;
  receive the data from the electronic device;
  encrypt, using the DKI, the data so as to create encrypted data;
  instruct the wireless transceiver to send a data packet containing the encrypted data; and
  execute a portion of an authentication protocol, the authentication protocol including:
    (1) receiving encrypted data (e-Data[i]) and a DDT[i];
    (2) decrypting the e-Data[i]) using DDT[i], thereby generating Data[i];
    (3) manipulating Data[i], thereby generating m-Data[i];
    (4) encrypting m-Data[i] using DDT[i], thereby generating e-m-Data[i]
    (5) sending e-m-Data[i] to a host configured to verify that m-Data[i] corresponds to Data[i];
    (6) repeating operations (1) through (5) for i=1 to m, where m is greater than one.

* * * * *